United States Patent
Schmitz et al.

(10) Patent No.: US 6,795,764 B2
(45) Date of Patent: Sep. 21, 2004

(54) METHOD AND DEVICE FOR INPUTTING SPEED LIMITING VALUES FOR A SPEED LIMITER OF A VEHICLE

(75) Inventors: Peter Schmitz, Aachen (DE); Rainer Busch, Aachen (DE)

(73) Assignee: Ford Golbal Technologies, LLC, Dearborn, MI (US)

( * ) Notice: Subject to any disclaimer, the term of this patent is extended or adjusted under 35 U.S.C. 154(b) by 0 days.

(21) Appl. No.: 10/063,270

(22) Filed: Apr. 5, 2002

(65) Prior Publication Data

US 2003/0023364 A1 Jan. 30, 2003

(30) Foreign Application Priority Data

Apr. 6, 2001 (GB) .......................................... 01108671

(51) Int. Cl.[7] ................................................. G06F 7/00
(52) U.S. Cl. ....................... 701/93; 701/110; 180/170; 342/29; 342/109; 340/435; 340/902
(58) Field of Search ............................. 701/93, 70, 96, 701/301, 95; 180/170, 179, 174, 282, 178, 176, 177; 340/438, 441, 902, 903, 435, 436, 444, 467, 465; 342/29, 10, 109

(56) References Cited

U.S. PATENT DOCUMENTS

| 4,224,907 A | 9/1980 | Lefeuvre et al. |
| 5,016,589 A | 5/1991 | Terazawa |
| 5,092,153 A | 3/1992 | Ikari |
| 5,665,026 A | 9/1997 | Linden |
| 5,774,820 A | * 6/1998 | Linden et al. ................. 701/93 |
| 5,794,735 A | 8/1998 | Sigl |
| 5,979,582 A | * 11/1999 | Hakansson et al. .......... 180/170 |
| 6,052,644 A | * 4/2000 | Murakami et al. ............. 701/93 |
| 6,076,622 A | 6/2000 | Chakraborty |
| 6,116,369 A | * 9/2000 | King et al. .................. 180/169 |
| 6,155,050 A | 12/2000 | Blanz et al. |
| 6,347,273 B1 | * 2/2002 | Adelsson et al. .............. 701/96 |
| 6,405,119 B1 | * 6/2002 | Linden ......................... 701/95 |
| 6,460,645 B1 | * 10/2002 | Asada et al. ................. 180/179 |
| 2002/0138190 A1 | * 9/2002 | Hellmann et al. ............. 701/78 |
| 2002/0193932 A1 | * 12/2002 | McCurdy ...................... 701/97 |

FOREIGN PATENT DOCUMENTS

| DE | 19509492 A1 | 9/1996 | |
| JP | 02301671 A | * 12/1990 | ............. F02P/9/00 |

* cited by examiner

*Primary Examiner*—Thomas G. Black
*Assistant Examiner*—Tuan C To
(74) *Attorney, Agent, or Firm*—Frank A. MacKenzie

(57) ABSTRACT

The invention relates to the input of speed limiting values into a speed limiter in a vehicle. The speed limiting value which is to be complied with is set by activating a key (7) on an input device (8) one or more times. That speed limiting value of the predefined speed limiting values which is the next highest in relation to the current speed of the vehicle is selected. If the current speed of the vehicle is higher than the highest predefined speed limiting value, the speed limiter is deactivated or the speed of the vehicle plus a speed difference is accepted as the speed limiting value. In exceptional situations, the speed limiter can be temporarily suspended, it being possible for an exceptional situation to be, in particular, the upward transgression of the predefined speed limiting value or a rapid depression of the gas pedal.

15 Claims, 2 Drawing Sheets

METHOD AND DEVICE FOR INPUTTING SPEED LIMITING VALUES FOR A SPEED LIMITER OF A VEHICLE

BACKGROUND OF INVENTION

The invention relates to a method for limiting the speed of a vehicle, a device for carrying out this method and a vehicle having a device of this type.

Devices and methods for automatic speed control in vehicles are known. For instance, there are what are referred to as cruise controls that, when activated, maintain the current speed of the vehicle constantly until the driver intervenes in the driving process by activating the gas pedal or the brake, which leads to deactivation of the cruise control. Furthermore, speed limiters are known in which the driver exerts complete control of the vehicle up to a set speed limiting value and an automatic intervention into the driving characteristics takes place only if the speed approaches the speed limiting value. The intervention is intended to ensure that the predefined speed limiting value is not exceeded and thus to prevent legally prescribed speed limits being undesirably exceeded.

A system of the type just mentioned is known, for example, from DE 1 95 09 492 A1. In said publication, a particular method is applied in which an intervention into the driving characteristics already takes place when the speed approaches the predefined speed limiting value.

In addition, U.S. Pat. No. 6,076,622 discloses a speed limiter in which information from a distance sensor, which detects when the vehicle is approaching another vehicle, is additionally taken into account.

Against this background, the object of the present invention is to make available a vehicle with a speed limiter which is easy and reliable to operate in a variety of driving situations.

SUMMARY OF INVENTION

This object is achieved by means of a method, a device and a vehicle having the features of the corresponding independent claims. The subclaims contain advantageous refinements.

Firstly, a proposed method for inputting speed limiting values will be explained in detail for the speed limiter of a vehicle. After an activation element is activated by the driver of the vehicle, a current, effective speed limiting value $v_{lim}$, which depends on the current speed $v_{act}$ of the vehicle, is set.

It is important for the convenience and the reliability of a speed limiting system that the driver can prescribe desired speed limiting values in a simple and intuitive fashion. This objective is achieved with the proposed method because the current speed of the vehicle is taken into account in the evaluation of the activation of the activation element. As a result, it is possible to react in a way that is matched to an optimum degree to the input by the driver. This makes the system considerably easier to operate because the settings that are inappropriate for the situation/speed of the vehicle are automatically excluded and the settings that correspond best to the prevailing situation/speed of the vehicle can be adopted with maximum preference. Simplifying the process in which the system is operated in this way serves not only to improve convenience but also safety because the risk of incorrect settings is reduced and the driver is not distracted from the events on the road by awkward inputting procedures.

The selection of a current speed limiting value $v_{lim}$ after the activation element has been activated can take place, for example, in such a way that, if possible, the next highest predetermined speed limiting value in relation to the current speed $v_{act}$ of the vehicle is selected. Which speed limiting values are predefined for selection depends, in particular, on the respective legal provisions. Thus, in Germany, there is usually a speed limiting value $v_{30}$=30 km/h for residential areas and a speed limiting value $v_{50}$=50 km/h for built-up areas. If appropriate, a single speed limiting value can also be predefined for "selection". In the proposed selection method, that speed limiting value which is closest to the current speed of the vehicle and at the same time higher than it is automatically searched for. In the specified example, given a speed $v_{act}$ of a vehicle of 20 km/h, the limiting value $v_{30}$ would thus be selected, and given a speed $v_{act}$ of a vehicle of 35 km/h the limiting value $v_{50}$ would thus be selected. If the speed $v_{act}$ of the vehicle should happen to be above the maximum predefined speed limiting value $v_{50}$, the proposed selection method cannot be applied. In this case, a suitable alternative selection, for example that of the highest, predefined speed limiting value $v_{50}$, must be made. An alternative embodiment is explained in more detail below.

The method for selecting a speed limiting value from a predefined set of a plurality of speed limiting values can be developed in such a way that the respective next highest speed limiting value from the series of predefined speed limiting values can be adopted as the current speed limiting value by means of repeated activations of the activation element in close succession. Accordingly, during the first activation of the activation element, a first speed limiting value of the predefined speed limiting values is selected, which can be, as explained, the next highest value in relation to the current speed of the vehicle. However, if the driver does not wish to retain this value, he can cause the next highest of the predefined speed limiting values to be set as the effective speed limiting value by activating the activation key again within a predefined time interval after the first activation. If this speed limiting value is not the desired speed limiting value either, it is possible, by activating the activation key once more, which again must be done within the predefined time interval after the last activation, to make a further jump to the next highest speed limiting value and so on until the desired limiting speed is set.

If the maximum predefined speed limiting value should happen to be reached in the method just explained and if a renewed activation of the activation element should happen to take place within the predefined time interval after the last activation, said renewed activation is preferably interpreted as being a command for deactivation of the speed limiter so that a corresponding signal is generated.

Furthermore, a signal for deactivating the activated speed limiter can be generated if the predefined time interval mentioned above since the last activation of the activation element has expired and the activation element is activated again after that.

The activation element serves, on the one hand, to set a desired speed limiting value and, if appropriate, to activate the speed limiter. On the other hand, it serves simultaneously to deactivate the speed limiter if it is no longer desired. It thus becomes possible for a single activation element to be used for the entire operator control of this limitation process, said element reacting suitably to its activation depending on the situation. This not only provides greater convenience and makes the system easier to operate but also considerably improves the safety. The driver can in fact activate the activation element without looking because it is not a case of selecting one key of several or one specific position setting.

According to one embodiment of the proposed method, after the activation element has been activated, the current speed $v_{act}$ of the vehicle increased by a speed difference $\Delta v$ is set as the current speed limiting value $v_{lim}$, i.e., $v_{lim}=v_{act}+\Delta v$. Similarly to a cruise control, the driver can thus set the vehicle to a specific speed and predefine said speed to the automatic system at a guideline value. However, in contrast to a cruise control, no attempt is made to maintain this speed constantly but rather the automatic system merely ensures that the set speed is not exceeded. Such an adoption of a speed of the vehicle as a speed limiting value is possible in combination with the use of predefined speed limiting values as explained above: if the vehicle is at a vehicle speed below the maximum predefined speed limiting value when the activation element is activated, said limiting value or a correspondingly lower speed limiting value can be adopted. On the other hand, if the speed of the vehicle is higher than the highest available predefined speed limiting value, the previously explained method of the adoption of the current speed of the vehicle as a guideline value is applied. In this way, any desired limiting value can be set in an approximated fashion at higher speeds (for example for limiting the speed of the vehicle to 100 km/h on country roads).

The speed difference $\Delta v$ can be treated as a predefined constant. However, it is preferably selected, taking into account the instantaneous acceleration of the vehicle, in such a way that the speed of the vehicle cannot exceed the set speed limiting value $v_{lim}$ until the speed limiter becomes effective. This prevents the situation in which, when the activation element is activated, the current speed of the vehicle which is adopted as the speed limiting value is one which is exceeded just a short time later due to the current acceleration of the vehicle, the upward transgression of the limiting value taking place before the speed limiter can become active and effective. The speed difference $\Delta v$ thus constitutes a safety margin for the functioning of the speed limiter.

According to one embodiment of the method, a signal for reactivating the deactivated speed limiter is generated if the activation element is activated. This means that the switched-off speed limiter is also switched on again by means of the activation element. The activation takes place if the activation element is activated once or if it is activated repeatedly in succession, in which case however there cannot be more than one predefined time interval between individual activations.

Furthermore, a signal for deactivating the activated speed limiter is preferably generated if the vehicle is switched off. This ensures that whenever the vehicle starts, the speed limiter is in the deactivated state.

An input device is also proposed for inputting speed limiting values for a speed limiter of a vehicle. This device has at least one activation element which can be operated by the driver, and a signal input for transmitting a signal which indicates the current speed $v_{act}$ of the vehicle. Furthermore, the input device is configured in such a way that it can carry out a method of the type explained above. After the activation element has been activated, a current speed limiting value $v_{lim}$, which depends on the current speed $v_{act}$ of the vehicle, is thus set by the input device.

Moreover, a method for limiting the speed of a vehicle is proposed in which, as measures for complying with a predefined speed limiting value $v_{lim}$, it is preferable to reduce the power of the propulsion unit and/or the torque of the propulsion unit of the vehicle and/or to implement a braking torque if the current speed $v_{act}$ of the vehicle approaches the predefined limiting value $v_{lim}$ or exceeds it. The method is defined in that the aforesaid measures for limiting the speed are temporarily suspended in exceptional situations. On the other hand, after the exceptional situation passes, the measures, and thus the speed limitation, are re-applied if the above preconditions for their activation still apply.

Taking into account exceptional considerably increases the safety of the speed limitation in traffic because in an emergency the driver still has complete control of the vehicle without having to deactivate the speed limiter himself in advance. In exceptional situations, there is in fact no time for such a deactivation initiated by the driver. In addition, such deactivation can easily be forgotten under stressful conditions.

There are various possibilities for the definition of exceptional situations which lead to the speed limiter being suspended. According to a first variant, an exceptional situation occurs if the current speed $v_{act}$ of the vehicle exceeds the instantaneously predefined speed limiting value $v_{lim}$ by more than a predefined speed excess $v_{extra}$: $v_{act}>v_{lim}+v_{extra}$. Such an exceptional situation can occur if the measures taken by the speed limiter were not able to prevent the predefined speed limiting value $v_{lim}$ from being exceeded. This may be the case, for example, when the vehicle is traveling downhill. As soon as the speed is exceeded in such a way, the measures for limiting the speed are suspended so that the driver is given sole, unaffected control of the vehicle. In this way, it is possible to avoid, for example, skidding when traveling down extreme inclines, which could occur as a result of excessively severe deceleration interventions by the speed limiter.

In the case just explained, the measures for limiting the speed are preferably incrementally reduced as the amount the speed $v_{act}$ of the vehicle exceeds the set speed limiting value $v_{lim}$ is increased. If the speed $v_{act}$ of the vehicle lies above the speed limiting value $v_{lim}$ by the abovementioned speed excess $v_{extra}$, the measures for limiting the speed are completely switched off. This ensures that the speed limitation is continuously reduced from 100% to 0% in a range of the speed of the vehicle between the predefined speed limiting value $v_{lim}$ and a value which is higher by the speed excess $v_{extra}$. Conversely, when the speed of the vehicle is decreased, there is a corresponding continuous graduated implementation of the measures for limiting the speed limitation. This ensures that an abrupt transition between the activation and the suspension of the speed limiter, which could adversely affect the driving characteristics of the vehicle, does not take place.

According to another refinement of the method, an exceptional occurs if the position s of the gas pedal and/or the rate ds/dt of the change in position of the gas pedal fulfill a predefined criterion, which points to the request for a high acceleration. Thus, it may, for example, be the case that the driver briefly wishes to effect a maximum acceleration of the vehicle and upward transgression of the predefined speed limiting value during an overtaking procedure or in order to avoid a critical situation. This would not be possible with the speed limiter activated because it would actually attempt to prevent the predefined speed limiting value being exceeded. Accordingly, the driver would have to explicitly deactivate the speed limiter in advance by means of a corresponding operating procedure, which is not only awkward and time-consuming in an emergency situation but is also easily forgotten. For this reason, it is proposed that the observed position and/or rate of the change in position of the gas pedal be taken as a starting point that the driver wishes a maximum acceleration of the vehicle. During detection of such a state, the speed limiter can then be automatically suspended until the criteria for the exceptional situation are no longer fulfilled.

The criterion for the presence of an exceptional situation can consist, for example, in a case when the position s of the gas pedal is beyond a predefined limiting position $s_{lim}$. Thus, an exceptional can be adopted, for example, if the position s of the gas pedal lies between 95% and 100% of the activation travel. In addition, or alternatively, the rate ds/dt of the change in position of the gas pedal can also be used during the detection of an exceptional situation. Here, rapid depression of the gas pedal indicates, through a high rate in the change in position, that a maximum acceleration of the vehicle is expected to be required. Therefore, to detect the exceptional it is not necessary to wait until the gas pedal has been depressed beyond a limiting position.

The activation and/or deactivation of the measures for limiting the speed are/is preferably carried out continuously. In this way, abrupt transitions which could have an adverse effect on the driving characteristics of the vehicle, are avoided.

Furthermore, a control device for limiting the speed of a vehicle is proposed. This device contains an apparatus for reducing the power of the propulsion unit and/or the torque of the propulsion unit and/or for implementing the braking torque. This apparatus is activated if the current speed $v_{act}$ of the vehicle approaches a prescribed speed limiting value $v_{lim}$ or exceeds it. The control device is defined in that it is configured to carry out a method of the type exations the control device temporarily suspends the speed limiting measures. The type of exceptional and their handling can correspond to the variants of the method exlsion unit and an input device for inputting speed limiting values for a speed limiter and having a control device, coupled to the input device, for limiting the speed of the vehicle. The input device and/or the control device can be implemented here as one of the types explained above.

In this vehicle, the input device preferably contains a display which indicates the operating states of the control device to the driver. In particular, it is possible to indicate whether the control device is switched on or off or whether its activity is temporarily suspended owing to an exceptional state. The suspension in the case of an exceptional state is preferably indicated by means of a particularly conspicuous form of indication such as flashing.

The vehicle can have in particular an internal combustion engine and/or an electric motor as its propulsion unit. The use of an electric motor is preferred because it can also be used to implement a braking torque which actively supports the speed limitation in its task of preventing a speed limiting value from being exceeded.

BRIEF DESCRIPTION OF DRAWINGS

The invention is explained in more detail below by way of example with reference to the figures, in which.

DETAILED DESCRIPTION

Figure 1:
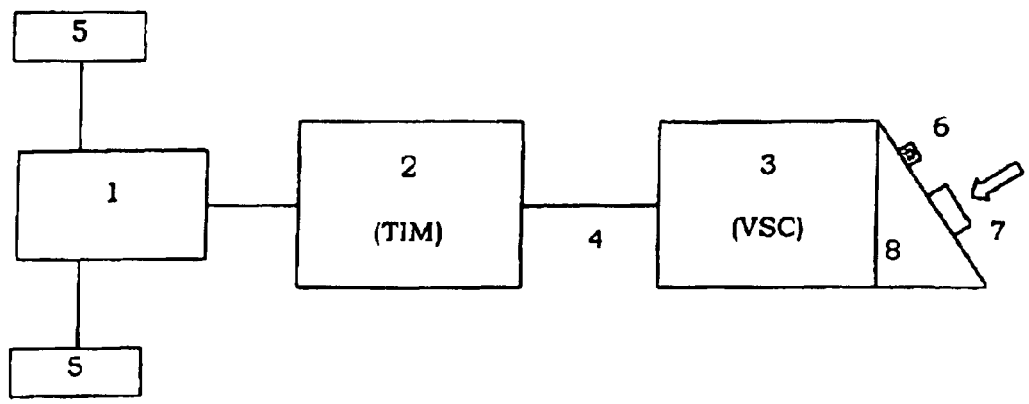
FIG. 1 is a schematic view of the components of a vehicle with a speed limiter.

FIG. 1 is a schematic view of the components of a vehicle with which a system for speed limitation is implemented.

The vehicle has a drive system which is composed of the propulsion unit 1 and the wheels 5 which are connected to the propulsion unit, if appropriate via a gear mechanism. In the case illustrated, the propulsion unit 1 is intended to be an electric motor, but the following embodiments also apply similarly for the use of an internal combustion engine.

The propulsion unit 1 is regulated by a propulsion unit regulator 2 (TIM). The propulsion unit regulator 2 is in turn connected via a bidirectional connecting line 4 to a vehicle system regulator 3 (VSC), which is responsible for the entire coordination of the transmission power, for the interaction with the driver and the like.

Although the propulsion unit regulator 2 and the vehicle system regulator 3 are illustrated as two physically separate systems in FIG. 1, they can also be accommodated in the same physical control unit. In this case, the connection 4 would be, for example, a pure software interface. The illustrated system is, however, usually arranged distributed over the entire vehicle. The communication between the propulsion unit regulator 2 and the vehicle system regulator 3 therefore requires a physical communication connection 4, such as a standardized Controller Area Network (CAN), for example.

The acceptable vehicle speed is increasingly limited by legal requirements. In Europe, the speed limits of 30, 50 or 70 km/h frequently apply. With the high-performance or high-torque propulsion units which are increasingly common, such speed limits can be exceeded even with slight pressure on the gas pedal. In order to prevent this, the speed limiting function described in more detail below is used.

When a speed limiting function is designed, a plurality of aspects are to be considered. For example, a torque limiter which is to be implemented in a simple way for the propulsion unit is not expedient in all possible situations because the torque and the speed of the vehicle are related to one another via the tractive resistance. For this reason, a higher torque is required, for example given the same speed when traveling uphill than when traveling on the flat.

Furthermore, it is desirable if no rigid limitation of the speed is implemented but rather if the driver retains the possibility of temporarily exceeding the speed limiting value in emergencies in order, for example, to be able to reliably carry out an overtaking maneuver. Moreover, it is desirable for the convenience and the prevention of operating errors if the interface between the system and the driver functions as simply, reliably and transparently as possible.

Finally, when the vehicle control is divided similarly to that shown in FIG. 1, it is necessary to ensure that the respective control functions are unambiguously assigned to the modules and that communication can take place, for example, via a CAN.

In order to achieve the abovementioned objectives, the vehicle system regulator 3 illustrated in FIG. 1 is additionally equipped with an input function, while the propulsion unit regulator 2 is given the additional function of a speed limiter. Firstly, the function of the input device 8 will be explained in more detail.

The interface with the driver which is formed at the input device 8 comprises essentially a knob 7 which the driver can activate by pressing, and a signal lamp 6 (LED). By activating the knob 7 one or more times, the driver can make various settings relating to the speed limitation. The reaction of the input device 8 to an activation of the activation element 7 depends here essentially on the current vehicle speed $v_{act}$, which is communicated to the input device 8 via signal lines 4 from the propulsion unit regulator 2. The following table gives the reactions of the input device 8 to activations of the key 7 for various speeds $v_{act}$ of the vehicle:

| | | Vehicle speed $V_{act}$ [km/h] | | |
|---|---|---|---|---|
| | | ≤30 | ≤50 | >50 |
| Action | Signal 6 | | selected $V_{lim}$[km/h] | |
| 1) Start of vehicle | off | — | — | — |
| 2) Driver presses key 7 | on | 30 | 50 | $V_{act} + \Delta v$ |
| 3) Driver presses key 7 briefly again after 2) | on | 50 | 50 | $V_{act} + \Delta v$ |
| 4) Driver presses key 7 for a relatively long time after 2) or 3) or driver presses key 7 again briefly after 3) | off | — | — | — |

When the vehicle is started by turning the ignition key, the speed limiting function is thus disabled, for which reason the signal lamp 6 remains unlit. The driver has complete control of the torque and the performance of the power transmission.

If the driver presses the key 7 once, the speed limiter is activated, and a value which depends on the current speed $v_{act}$ as follows is defined as the speed limiting value: If $v_{act}$ is lower than 30 km/h, the speed limiting value is set to 30 km/h. If the $v_{act}$ is between 30 km/h and 50 km/h, the speed limiting value is set to 50 km/h. On the other hand, if $v_{act}$ is above 50 km/h, the speed limiting value is set to the current vehicle speed $v_{act}$ plus a speed difference $\Delta v$. $\Delta v$ can be calculated in different ways. In the simplest case, $\Delta v$ is constant, for example $\Delta v=5$ km/h. An advanced approach comprises taking into account the instantaneous vehicle acceleration in order to increase or reduce $\Delta v$ correspondingly. The purpose of $\Delta v$ is to prevent the speed of the vehicle exceeding the set speed limiting value particularly in the phase during which the speed limiter switches over from the deactivated state to the activated state.

As is also apparent from the table, when the key 7 is activated repeatedly, a distinction is made as to whether the activations take place in rapid succession or whether a predefined time interval is exceeded between two activations.

The function of the speed limiter which is implemented in the propulsion unit regulator 2 will be described in more detail below. The speed limiter can be activated or deactivated, which takes place in the way explained above by means of the input device 8. If the speed limiter is basically activated, it monitors the state of the vehicle and engages in the driving process if the current speed $v_{act}$ of the vehicle and the position s of the gas pedal fulfills specific criteria. Firstly, the effect of the current speed $v_{act}$ of the vehicle will be considered.

The current speed $v_{act}$ of the vehicle is usually below the set speed limiting value $v_{lim}$. An intervention of the speed limiter is not necessary if it is active in a basic monitoring mode because a corresponding activation flag has been transmitted by the input device 8.

If the driver then attempts to accelerate the vehicle beyond the predefined speed limiting value $v_{lim}$, the propulsion unit regulator 2 reduces or limits the torque in such a way that the speed limiting value is not exceeded. Here, a braking torque can preferably also be implemented if this is possible, for example as in the case of the electric motor 1.

Figure 2:
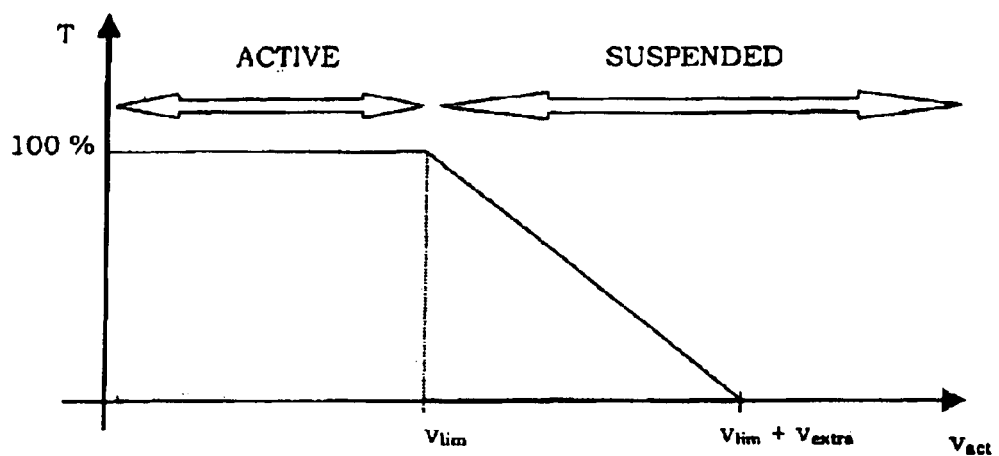
FIG. 2 shows a diagram relating to the graduated activation and deactivation of measures for limiting the speed when the predefined speed limiting value is exceeded.

When traveling downhill for example, it is possible for a situation to occur in which the speed limiter is not capable of keeping the speed of the vehicle below the predefined speed limiting value. If the speed of the vehicle then exceeds the speed limiting value $v_{lim}$, the state of the speed limiter is changed from ACTIVE to SUSPENDED. The corresponding transition is illustrated in FIG. 2, the current speed $v_{act}$ of the vehicle being represented on the horizontal axis and the maximum permitted braking torque T being represented on the vertical axis. As is apparent from the diagram, the maximum torque T which can be applied after the speed limiting value $v_{lim}$ has been exceeded is reduced from 100% in a ramp shape to 0%, or "deactivated in a graduated fashion", the complete deactivation taking place at the speed $v_{lim}+v_{extra}$. Beyond this speed, the speed limiter is therefore no longer effective and the driver has sole control of the vehicle. If the speed $v_{act}$ of the vehicle is then reduced again, in the reversal of this process the maximum torque T which can be applied, and thus the speed limiter is then "activated again in a graduated fashion" continuously from 0% to 100%. Below the speed limiting value $v_{lim}$, the state of the speed limiter then changes again from SUSPENDED to ACTIVE.

The described characteristics thus take into account an exceptional which comprises the predefined speed limiting value $v_{lim}$ being exceeded, the measures of the speed control being deactivated and activated in a gradual transition during the exceptional situation.

A further exceptional is defined by means of the state of the gas pedal. The position s of the gas pedal is expressed here, for example, by means of a standardized value between 0% and 100%, s=100% corresponding to a completely depressed gas pedal. If the position s of the gas pedal is below a predefined limiting value $s_{lim}$, the speed limitation is not influenced. However, in the case of an emergency situation it is possible that the driver requires a maximum torque and would like to exceed the predefined speed limiting value. For this reason, the function of the speed limiter is temporarily suspended if the position s of the gas pedal exceeds the predefined threshold $s_{lim}$. The limiting value $s_{lim}$ can be predefined here or calculated during driving.

In addition, the rate ds/dt of change of the position s can be used in order to permit a more rapid response and identification of the exceptional situation. During the exceptional situation which is indicated by means of the gas pedal, the speed limiter is switched over from the ACTIVE state to the SUSPENDED state in a way similar to that explained above for the speeds of the vehicle.

By means of appropriate filtering such as, for example, a P-T1 filter, it should be ensured here that the torque does not make a jump when the suspension occurs. Such a jump would take place if a reduction in the torque which then suddenly dropped away subsequently were implemented by the speed limiting function up to the point where the pedal position $s_{lim}$ is reached.

Figure 3:
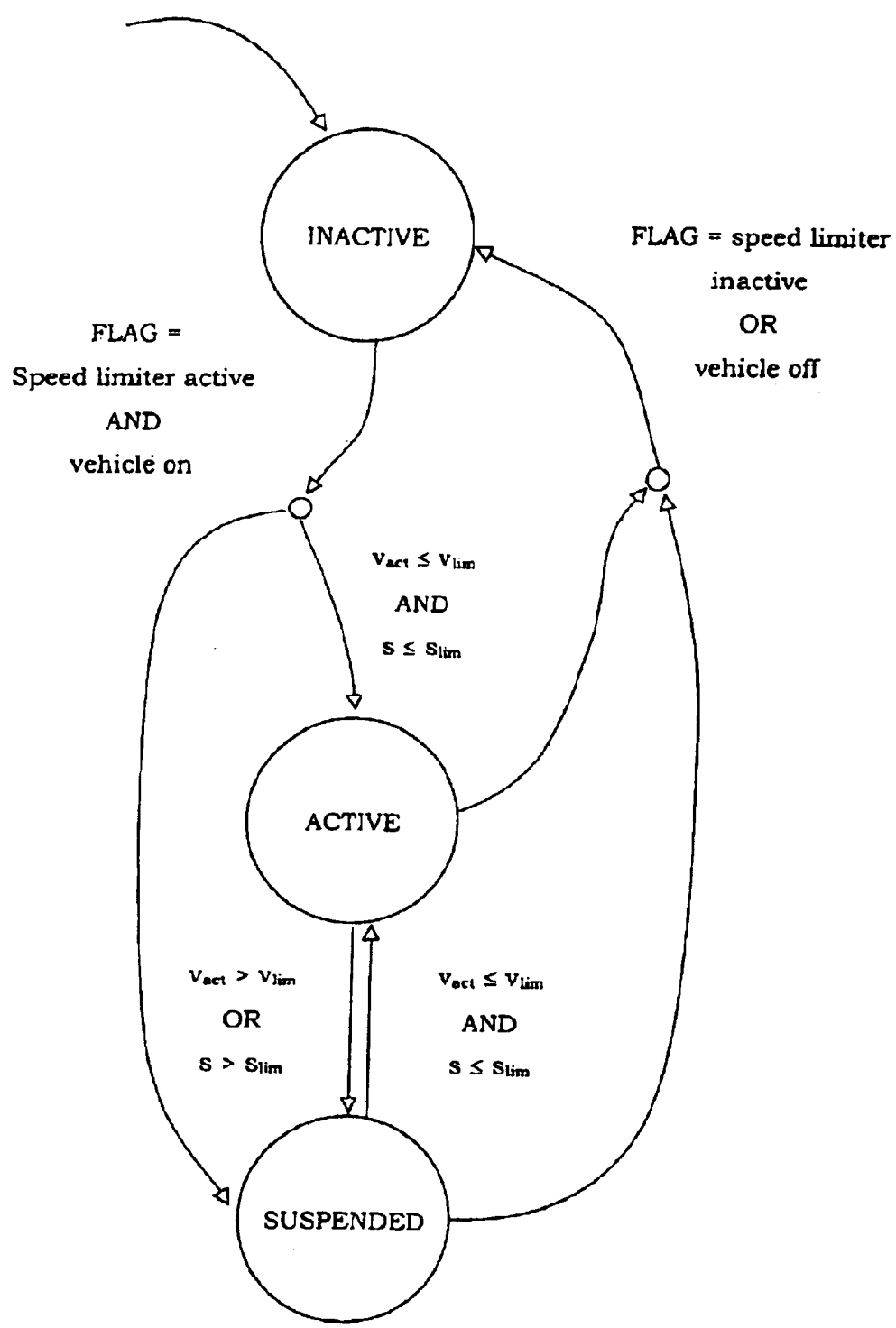
FIG. 3 shows a diagram with the state transitions of the speed limiter.

FIG. 3 shows a state diagram for the speed limiter which is implemented in the propulsion unit regulator 2. The speed limiter changes into the switched-on ACTIVE state from the switched-off INACTIVE state if an activation flag is set by the input device 8 (FIG. 1) and the vehicle is started.

As has been explained above, the ACTIVE state is temporarily exited in exceptional situations by going into the SUSPENDED state. Such a transition takes place if the current speed $v_{act}$ of the vehicle is higher than the prescribed speed limiting value $v_{lim}$ or if the position s of the gas pedal exceeds a limiting value $s_{lim}$. If the aforesaid conditions already apply when the INACTIVE state is exited, a transition into the SUSPENDED state from there takes place immediately.

As soon as the preconditions for the SUSPENDED state no longer apply, said state is exited by jumping back into the ACTIVE state. In this context, the combined monitoring of the gas pedal position and of the pedal speed together with the monitoring of the vehicle speed proves particularly advantageous (even if both monitoring criteria can also only be implemented individually): for example, in order to initiate an acceleration process due to overtaking, the gas pedal is firstly depressed or activated very rapidly so that there is a transition to the SUSPENDED state. The acceleration results in a speed of the vehicle which frequently lies above $v_{lim}$ so that the SUSPENDED state is firstly still retained even when the gas pedal is released, and the system changes unnoticeably and continuously back to the ACTIVE state as the speed drops.

If the activation flag for the speed limiter is cancelled by the input device 8 or if the vehicle is switched off, a jump back into the INACTIVE state from the ACTIVE or SUSPENDED states takes place.

The transitions which are illustrated in the state diagram of FIG. 3 are implemented in such a way that they take place continuously and without abrupt transitions in the behavior of the vehicle.

A typical use scenario for the speed limiter according to FIG. 1 is described below. Firstly, the driver activates the speed limiting function by activating the key 7. The input device 8 then reads the current vehicle speed $v_{act}$ and calculates the speed limiting value $v_{lim}$. The latter is transmitted to the propulsion unit regulator 2 together with an activation request. The propulsion unit regulator 2 then controls the propulsion unit, using positive and negative propulsion unit torques, in such a way that the predefined speed limiting value $v_{lim}$ is not exceeded.

The input device 8 also transmits the limiting value $s_{lim}$ for the position of the accelerator pedal, which limiting value $s_{lim}$ is used by the propulsion unit regulator 2 to switch over into the SUSPENDED state if appropriate.

The states of the speed limiter illustrated in FIG. 3 are transmitted to the input device 8 via the connection 4. The respective state is then symbolized by the signal lamp 6 in accordance with the following table in order to inform the driver of the function of the speed limiter.

| State | Signal lamp |
|---|---|
| ACTIVE | on |
| INACTIVE | off |
| SUSPENDED | flashing |

The communication between the input device 8 and the speed limiter 2 takes place via the communications interface 4. The latter is represented by a set of variables which are transmitted either via a physical communications connection (for example CAN) or via a pure software interface. The following data formats are typically used here:

Signals from the input device 8 to the propulsion unit regulator 2:
 a) Speed limiting value $v_{lim}$:
  1-byte variable, resolution 1 km/h;
 b) Speed limiter active:
  1-byte flag, AAh=TRUE, 00=FALSE;
Communication from the propulsion unit regulator 2 to the input device 8:
 a) Status of the speed limiter:
  1-byte variable, states: INACTIVE, ACTIVE, SUSPENDED.

While certain embodiments of the present invention have been described in detail, those familiar with the art to which this invention relates will recognize various alternative designs and embodiments for practicing the invention as defined by the following claims.

What is claimed is:

1. A method for inputting speed limiting values into a speed limiting device of a vehicle comprising:
 providing said speed limiting device, providing a plurality of pre-set speed limiting values to said speed limiting device, wherein said plurality of pre-set speed limiting values are vehicle speed values of the vehicle,
 activating said speed limiting device, and
 first actuating an activation element, said first actuating an activation element causing a first speed limiting value of said plurality of pre-set speed limiting values to be input to said speed limiting device.

2. The method of claim 1, wherein said first speed limiting value is both higher than and, of said plurality of pre-set speed limiting values, closest to the speed of said vehicle at the moment of said first actuating.

3. The method of claim 2, further comprising the step of second actuating said activation element within a first time interval after said first actuating, said second actuating causing a second speed limiting value of said plurality of pre-set speed limiting values to be input to said speed limiting device, wherein said second speed limiting value is both higher than and, of said plurality of pre-set speed limiting values, closest to said first speed limiting value.

4. The method of claim 2, further comprising the step of second actuating said activation element within a first time interval after said first actuating, said second actuating deactivating said speed limiting device when there is no second speed limiting value of said plurality of pre-set speed limiting values that is higher than said first speed limiting value.

5. The method of claim 2, wherein said first speed limiting value is further related to a speed difference.

6. The method of claim 5, wherein said speed difference is related to the acceleration of said vehicle at the moment of first actuating, such that said vehicle does not exceed said first speed limiting value before said first speed limiting value is input to said speed limiting device.

7. The method of claim 1, further comprising the step of further actuating said activation element, outside of a first time interval after said first actuating, whereby said further actuating causes said speed limiting device to be deactivated.

8. The method of claim 1, wherein the step of activating said speed limiting device is accomplished by said first actuating an activation element.

9. The method of claim 1, further comprising the step of deactivating said speed limiting device when said vehicle is turned off.

10. A method for inputting speed limiting values into a speed limiting device of a vehicle comprising:
 providing a speed limiting device,
 providing a plurality of pre-set speed limiting values to said speed limiting device, wherein said plurality of pre-set speed limiting values are vehicle speed values of the vehicle,
 activating said speed limiting device, and
 first actuating an activation element, said first actuating causing a first speed limiting value to be input to said speed limiting device as at least one of said plurality of pre-set speed limiting values, said first speed limiting value being related to the speed of said vehicle at the moment of first actuating.

11. The method of claim 10, wherein said first speed limiting value is further related to a speed difference.

12. The method of claim 11, wherein said speed difference is related to the acceleration of said vehicle at the moment of first actuating, such that said vehicle does not exceed said first speed limiting value before said first speed limiting value is input to said speed limiting device.

13. The method of claim 10, further comprising the step of further actuating said activation element, outside of a first time interval after said first actuating, whereby said further actuating causes said speed limiting device to be deactivated.

14. The method of claim 10, wherein the step of activating said speed limiting device is accomplished by said first actuating an activation element.

15. The method of claim 10, further comprising the step of deactivating said speed limiting device when said vehicle is turned off.

* * * * *